US012583496B2

(12) United States Patent
    Jiang

(10) Patent No.: US 12,583,496 B2
(45) Date of Patent: Mar. 24, 2026

(54) CART CAPABLE OF BEING LATERALLY OPENED

(71) Applicant: Zhongshan Weihong Daily Necessities Co., Ltd., Zhongshan (CN)

(72) Inventor: Yidong Jiang, Zhongshan (CN)

(73) Assignee: Zhongshan Weihong Daily Necessities Co., Ltd., Zhongshan (CN)

( * ) Notice: Subject to any disclaimer, the term of this patent is extended or adjusted under 35 U.S.C. 154(b) by 0 days.

(21) Appl. No.: 19/281,752

(22) Filed: Jul. 27, 2025

(65) Prior Publication Data

US 2025/0353531 A1 Nov. 20, 2025

(30) Foreign Application Priority Data

Jul. 4, 2025 (CN) ......................... 202521402567.1

(51) Int. Cl.
    *B62B 3/00* (2006.01)
    *B62B 3/02* (2006.01)
(52) U.S. Cl.
    CPC ............... *B62B 3/002* (2013.01); *B62B 3/02* (2013.01)
(58) Field of Classification Search
    CPC ................................. B62B 3/002; B62B 3/02
    See application file for complete search history.

(56) References Cited

U.S. PATENT DOCUMENTS

| | | | | | |
|---|---|---|---|---|---|
| 4,887,836 | A | * | 12/1989 | Simjian | B62B 3/007 |
| | | | | | 280/651 |
| 9,108,656 | B1 | * | 8/2015 | Nolan | B62B 3/02 |
| 9,365,225 | B2 | * | 6/2016 | Henao | B62B 3/002 |
| 10,077,062 | B2 | * | 9/2018 | Bowman | B62B 5/082 |
| 10,414,421 | B1 | * | 9/2019 | Westmoreland | B62B 3/10 |
| 11,388,999 | B1 | * | 7/2022 | Horowitz | B62B 3/022 |
| 2011/0079972 | A1 | * | 4/2011 | Watson | B62B 3/02 |
| | | | | | 280/47.35 |
| 2016/0031469 | A1 | * | 2/2016 | Bowman | B62B 3/022 |
| | | | | | 280/647 |
| 2016/0052534 | A1 | * | 2/2016 | Henao | B62B 5/067 |
| | | | | | 280/659 |
| 2019/0071110 | A1 | * | 3/2019 | Finstad | B62B 3/18 |
| 2021/0139062 | A1 | * | 5/2021 | Kelly | B62B 3/007 |

FOREIGN PATENT DOCUMENTS

| | | |
|---|---|---|
| CN | 107813858 A | 3/2018 |
| CN | 109398465 A | 3/2019 |
| CN | 216833716 U | 6/2022 |

* cited by examiner

*Primary Examiner* — Erez Gurari

(57) ABSTRACT

A cart capable of being laterally opened comprises a cart body, which comprises a main frame and a first side-bracket arranged on one side of the main frame, wherein a storage chamber is formed between the main frame and the first side-bracket. The first side-bracket is detachably connected to the main frame, when the first side-bracket is disconnected from the main frame, an upper end of the first side-bracket is flipped downward relative to a lower end toward a direction away from the storage chamber, thus to form a first side-opening communicated with the storage chamber at one side of the main frame. When goods or children need to be placed into the cart, the first side-bracket can be disconnected from the main frame, and then the goods or children can be placed into the storage chamber from the first side-opening, so its usage is more effort-saving and convenient.

17 Claims, 7 Drawing Sheets

| 271 | | 371 | |
|-----|--|-----|--|
| 272 | | 372 | |
| 273 | | 373 | |
| 274 | 27 | 374 | 37 |
| 275 | | 375 | |
| 276 | | 376 | |
| 277 | | 377 | |

CART CAPABLE OF BEING LATERALLY OPENED

CROSS-REFERENCE TO RELATED APPLICATIONS

The application claims priority to Chinese patent application No. 202521402567.1, filed on Jul. 4, 2025, the entire contents of which are incorporated herein by reference.

TECHNICAL FIELD

The present invention relates to the technical field of carts, and particularly relates to a cart capable of being laterally opened.

BACKGROUND

A cart is a practical transport tool that can be used not only for carrying goods but also for transporting children, making it convenient for outdoor travels. However, each side face of the existing cart is fixedly connected and cannot be disassembled, when people need to load goods or place children into the cart, they often have to lift the goods or children upward and over the side face of the cart before putting them into the cart from a top opening of the cart, thus the operation is cumbersome.

SUMMARY

The purpose of the present invention is to provide a cart capable of being laterally opened to solve the problem that it is very cumbersome to place goods or children into the cart because each side face of the existing cart is fixedly connected and cannot be disassembled.

In order to solve the above problem, the present invention provides the following technical solutions.

A cart capable of being laterally opened comprises a cart body, wherein the cart body comprises a main frame and a first side-bracket arranged on one side of the main frame, a storage chamber is formed between the main frame and the first side-bracket, and the first side-bracket is detachably connected to the main frame. When the first side-bracket is disconnected from the main frame, an upper end of the first side-bracket is flipped downward relative to a lower end thereof toward a direction away from the storage chamber, so as to form a first side-opening communicated with the storage chamber at one side of the main frame.

The cart capable of being laterally opened as described above, it further comprises a second side-bracket provided on the other side of the main frame, wherein the first side-bracket and the second side-bracket can be folded or unfolded at the same time, so as to drive the cart body to fold or unfold.

The cart capable of being laterally opened as described above, the second side-bracket is detachably connected to the main frame, when the second side-bracket is disconnected from the main frame, an upper end of the second side-bracket is flipped downward relative to a lower end thereof toward a direction away from the storage chamber, so as to form a second side-opening communicated with the storage chamber at the other side of the main frame.

The cart capable of being laterally opened as described above, the first side-bracket includes a first front bottom rod, a first rear bottom rod, a first front top rod, and a first rear top rod. The first front bottom rod is pivotally connected to the first rear bottom rod, and the first front top rod is pivotally connected to the first rear top rod.

When a pivot axis of the first front bottom rod and the first rear bottom rod is parallel to a pivot axis of the first front top rod and the first rear top rod, the first front bottom rod can rotate relative to the first rear bottom rod and the first front top rod can rotate relative to the first rear top rod, so as to fold or unfold the first side-bracket.

The first side-bracket further includes a first front turnover rod, a first rear turnover rod and a first connecting assembly. The first front turnover rod is parallel to and hinged with the first front bottom rod, and the first rear turnover rod is parallel to and hinged with the first rear bottom rod. The first connecting assembly interconnects the first front top rod, the first rear top rod, the first front turnover rod and the first rear turnover rod, so as to form the first turnover body.

When an articulated shaft of the first front turnover rod and the first front bottom rod is coaxial with an articulated shaft of the first rear turnover rod and the first rear bottom rod, the first front turnover rod can rotate relative to the first front bottom rod, and the first rear turnover rod can rotate relative to the first rear bottom rod, so that an upper end of the first turnover body is flipped downward relative to a lower end thereof toward a direction away from the storage chamber.

The cart capable of being laterally opened as described above, the first connecting assembly includes a first front diagonal rod, a first rear diagonal rod, and a first pivot mechanism. A front end of the first front diagonal rod is pivotally connected to a front end of the first front turnover rod, and a rear end of the first rear diagonal rod is pivotally connected to a rear end of the first rear turnover rod. The first pivot mechanism is respectively connected to a rear end of the first front top rod, a front end of the first rear top rod, a rear end of the first front diagonal rod, and a front end of the first rear diagonal rod, and enables the four ends to be pivotally connected to each other.

The cart capable of being laterally opened as described above, the first connecting assembly further includes a first front top pivot seat provided between the first pivot mechanism and the first front top rod, and a first rear top pivot seat provided between the first pivot mechanism and the first rear top rod. A front end of the first front top pivot seat is pivotally connected to a rear end of the first front top rod, a rear end of the first front top pivot seat is pivotally connected to the first pivot mechanism; a rear end of the first rear top pivot seat is pivotally connected to the front end of the first rear top rod, and a front end of the first rear top pivot seat is pivotally connected to the first pivot mechanism.

The first connecting assembly further includes a first front support rod, and a first rear support rod. An upper end of the first front support rod is pivotally connected to the first front top pivot seat, and a lower end of the first front support rod is pivotally connected to a rear end of the first front turnover rod. An upper end of the first rear support rod is pivotally connected to the first rear top pivot seat, and a lower end of the first rear support rod is pivotally connected to a front end of the first rear turnover rod.

The cart capable of being laterally opened as described above, a rear end of the first front bottom rod is provided with a first front bottom pivot pipe, a front end of the first rear bottom rod is provided with a first rear bottom pivot seat, and the first rear bottom pivot seat is pivotally connected to a middle portion of the first front bottom pivot pipe. When the first side-bracket is unfolded, the first front bottom pivot pipe abuts against an upper surface of the first rear bottom pivot seat.

The cart capable of being laterally opened as described above, the second side-bracket includes a second front bottom rod, a second rear bottom rod, a second front top rod, and a second rear top rod. The second front bottom rod is pivotally connected to the second rear bottom rod, and the second front top rod is pivotally connected to the second rear top rod.

When a pivot axis of the second front bottom rod and the second rear bottom rod is parallel to a pivot axis of the second front top rod and the second rear top rod, the second front bottom rod can rotate relative to the second rear bottom rod, and the second front top rod can rotate relative to the second rear top rod, so as to fold or unfold the second side-bracket.

The cart capable of being laterally opened as described above, the second side-bracket further includes a second connecting assembly. The second connecting assembly includes a second front diagonal rod, a second rear diagonal rod, and a second pivot mechanism. A front end of the second front diagonal rod is pivotally connected to a front end of the second front bottom rod, and a rear end of the second rear diagonal rod is pivotally connected to a rear end of the second rear bottom rod. The second pivot mechanism is respectively connected to a rear end of the second front top rod, a front end of the second rear top rod, a rear end of the second front diagonal rod, and a front end of the second rear diagonal rod, and enables the four ends to be pivotally connected to each other.

The cart capable of being laterally opened as described above, the second connecting assembly further includes a second front top pivot seat provided between the second pivot mechanism and the second front top rod, and a second rear top pivot seat provided between the second pivot mechanism and the second rear top rod. A front end of the second front top pivot seat is pivotally connected to a rear end of the second front top rod, a rear end of the second front top pivot seat is pivotally connected to the second pivot mechanism, a rear end of the second rear top pivot seat is pivotally connected to a front end of the second rear top rod, and a front end of the second rear top pivot seat is pivotally connected to the second pivot mechanism.

The second connecting assembly further includes a second front support rod, and a second rear support rod. An upper end of the second front support rod is pivotally connected to the second front top pivot seat, a lower end of the second front support rod is pivotally connected to a rear end of the second front bottom rod, an upper end of the second rear support rod is pivotally connected to the second rear top pivot seat, and a lower end of the second rear support rod is pivotally connected to a front end of the second rear bottom rod.

The cart capable of being laterally opened as described above, a rear end of the second front bottom rod is provided with a second front bottom pivot pipe, and a front end of the second rear bottom rod is provided with a second rear bottom pivot seat. The second rear bottom pivot seat is pivotally connected to a middle portion of the second front bottom pivot pipe; when the second side-bracket is unfolded, the second front bottom pivot pipe abuts against an upper surface of the second rear bottom pivot seat.

The cart capable of being laterally opened as described above, the second side-bracket includes a second front bottom rod, a second rear bottom rod, a second front top rod, and a second rear top rod. The second front bottom rod is pivotally connected to the second rear bottom rod, and the second front top rod is pivotally connected to the second rear top rod.

When a pivot axis of the second front bottom rod and the second rear bottom rod is parallel to a pivot axis of the second front top rod and the second rear top rod, the second front bottom rod can rotate relative to the second rear bottom rod, and the second front top rod can rotate relative to the second rear top rod, so as to fold or unfold the second side-bracket.

The second side-bracket further includes a second front turnover rod, a second rear turnover rod, and a second connecting assembly. The second front turnover rod is parallel to and hinged with the second front bottom rod, and the second rear turnover rod is parallel to and hinged with the second rear bottom rod. The second connecting assembly interconnects the second front top rod, the second rear top rod, the second front turnover rod, and the second rear turnover rod, so as to form a second turnover body.

When an articulated shaft of the second front turnover rod and the second front bottom rod is coaxial with an articulated shaft of the second rear turnover rod and the second rear bottom rod, the second front turnover rod can rotate relative to the second front bottom rod, and the second rear turnover rod can rotate relative to the second rear bottom rod, so that an upper end of the second turnover body is flipped downward relative to a lower end thereof toward a direction away from the storage chamber.

The cart capable of being laterally opened as described above, a locking device is provided between the first side-bracket and the main frame. The locking device includes a first locking seat a second locking seat, either the first locking seat or the second locking seat is arranged on the first side-bracket; either the first locking seat or the second locking seat is provided on the main frame. The first locking seat and second locking seat are connected by insertion, snap-fit, or a locking member.

The cart capable of being laterally opened as described above, the first locking seat is provided with a first locking hole, and the second locking seat is provided with a second locking hole. The locking member passes through the first locking hole and extends into the second locking hole, so as to connect the first locking seat with the second locking seat.

The cart capable of being laterally opened as described above, the first locking seat is provided with a mounting groove. The mounting groove is provided on a side of the first locking hole and communicated with the first locking hole, and the locking member is movably arranged within the mounting groove. One end of the locking member penetrates into the first locking hole, and a self-locking spring is provided between the other end of the locking member and a sidewall of the mounting groove. The self-locking spring has a tendency to drive the locking member to move toward a direction of extending into the second locking hole, an unlocking module is provided on the locking member. When the unlocking module is driven to move away from the second locking hole, the locking member is driven to retract from the second locking hole.

The cart capable of being laterally opened as described above, the first locking seat is provided with a limiting chute, and a through hole that communicates the limiting chute with the mounting groove. A longitudinal direction of the limiting chute is coaxial with an axial direction of the first locking hole. The unlocking module includes a dragging portion and a connecting portion, wherein the dragging portion is movably provided within the limiting chute. One end of the connecting portion is fixedly connected to the locking member, and the other end of the connecting portion passes through the through hole and fixedly connected to the dragging portion.

The cart capable of being laterally opened as described above, the locking member includes a locking portion, and a sleeve portion, wherein the locking portion has a diameter greater than that of the sleeve portion. The sidewall of the mounting groove is provided with a positioning groove and a positioning hole that are both coaxial with the first locking hole. One end of the locking member penetrates into the first locking hole, and the other end of the locking member is engaged with the positioning hole. The self-locking spring is sleeved around the sleeve portion, one end of the self-locking spring abuts against the locking portion, and the other end of the self-locking spring abuts against the positioning groove.

The cart capable of being laterally opened as described above, the first locking seat is provided with a first insertion plate, and a first insertion slot. The second locking seat is provided with a second insertion plate, and a second insertion slot. When the first locking seat is connected to the second locking seat, the first insertion plate is engaged with the second insertion slot, and the second insertion plate is engaged with the first insertion slot.

Compared with the prior art, the present invention has the following advantages.

The present invention provides a cart capable of being laterally opened, when goods or children need to be placed into the cart, a first side-bracket can be disconnected from a main frame, and then the goods or children can be placed into a storage chamber of the cart from a first side-opening, so its usage is more effort-saving and convenient. Moreover, after an upper end of the first side-bracket is flipped downward relative to a lower end toward a direction away from the storage chamber, the cart can form an opening seat for temporary ride, which is conducive to broadening the usage scenarios.

DETAILED DESCRIPTION OF EMBODIMENTS

Figure 1:
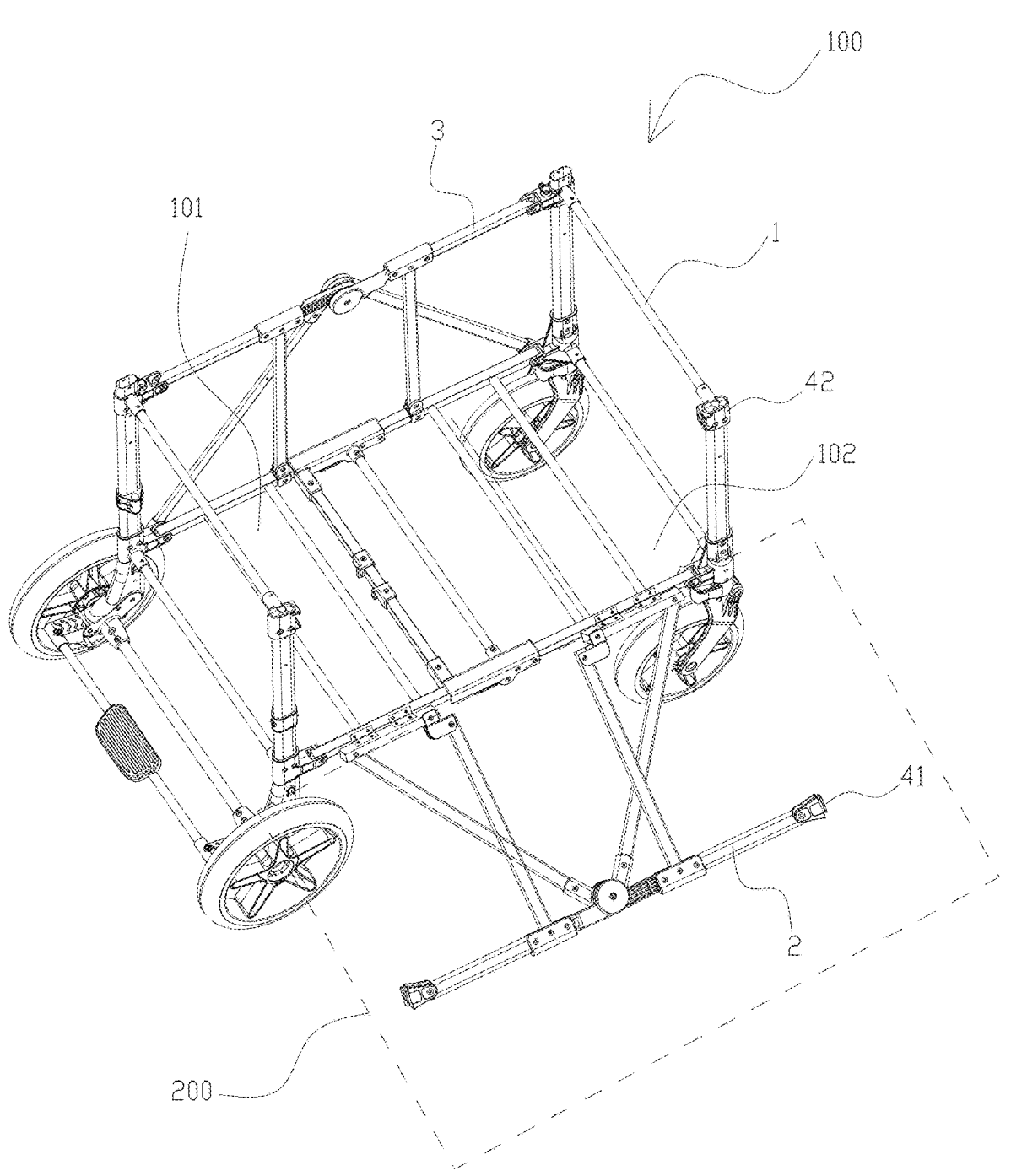
FIG. 1 is a schematic structural diagram showing that a first side-bracket of the cart capable of being laterally opened is flipped and opened, wherein a first side-opening is in an open state, according to the embodiment of the present invention.

The technical solutions in the embodiments of the present invention will be described clearly and comprehensively hereafter in combination with the accompanying drawings.

Apparently, the described embodiments represent only some embodiments of the present invention, but not all embodiments. All other embodiments obtainable by persons of ordinary skill in the art based on these embodiments without creative efforts shall fall within the protection scope of the present invention.

Please refer to FIGS. 1-7, this embodiment provides a cart capable of being laterally opened, which comprises a cart body 100, wherein the cart body 100 comprises a main frame 1 and a first side-bracket 2 arranged on one side of the main frame 1. A storage chamber 101 is formed between the main frame 2 and the first side-bracket 2, and the first side-bracket 2 is detachably connected to the main frame 1. When the first side-bracket 2 is disconnected from the main frame 1, an upper end of the first side-bracket 2 can be flipped downward relative to a lower end thereof toward a direction away from the storage chamber 101, so as to form a first side-opening 102 communicated with the storage chamber 101 at one side of the main frame 1.

According to the cart capable of being laterally opened in this embodiment, when goods or children need to be placed into the cart, the first side-bracket 2 can be disconnected from the main frame 1, and then the goods or children can be placed into the storage chamber 101 of the cart from the first side-opening 102, so its usage is more effort-saving and convenient. Moreover, after an upper end of the first side-bracket 2 is flipped downward relative to a lower end toward a direction away from the storage chamber 101, the cart can form an opening seat for temporary ride, which is conducive to broadening the usage scenarios.

Furthermore, in some embodiments, the first side-bracket 2 is configured as a bracket that cannot be folded. The main frame 1 is provided with at least two side-bracket junctions, wherein one of the side-bracket junctions is provided at the lower end of the first side-bracket 2 and is hingedly connected to the main frame 1, while the other side-bracket junction is provided at an upper portion of the first side-bracket 2 and is detachably connected to the main frame 1 through a locking device 4.

Furthermore, in some embodiments, the cart capable of being laterally opened further comprises a second side-bracket 3 provided on the other side of the main frame 1. The second side-bracket 3 is detachably connected to the main frame 1, when the second side-bracket 3 is disconnected from the main frame 1, an upper end of the second side-bracket 3 can be flipped downward relative to a lower end thereof toward a direction away from the storage chamber 101, so as to form a second side-opening 103 communicated with the storage chamber 101 at the other side of the main frame 1. When used, users can open either one side or both sides at the main frame 1 as needed, satisfying diverse usage scenarios.

Furthermore, in some embodiments, the first side-bracket 2 and the second side-bracket 3 can be folded or unfolded at the same time, so as to drive the cart body 100 to fold or unfold.

Specifically, the first side-bracket 2 includes a first front bottom rod 21, a first rear bottom rod 22, a first front top rod 23, and a first rear top rod 24. The first front bottom rod 21 is pivotally connected to the first rear bottom rod 22, and the first front top rod 23 is pivotally connected to the first rear top rod 24. When a pivot axis of the first front bottom rod 21 and the first rear bottom rod 22 is parallel to a pivot axis of the first front top rod 23 and the first rear top rod 24, the first front bottom rod 21 can rotate relative to the first rear bottom rod 22, and the first front top rod 23 can rotate relative to the first rear top rod 24, so as to fold or unfold the first side-bracket 2. The first side-bracket 2 further includes a first front turnover rod 25, a first rear turnover rod 26, and a first connecting assembly 27. The first front turnover rod 25 is parallel to and hinged with the first front bottom rod 21, and the first rear turnover rod 26 is parallel to and hinged with the first rear bottom rod 22. The first connecting assembly 27 interconnects the first front top rod 23, the first rear top rod 24, the first front turnover rod 25, and the first rear turnover rod 26, so as to form a first turnover body 200. When an articulated shaft of the first front turnover rod 25 and first front bottom rod 21 is coaxial with an articulated shaft of the first rear turnover rod 26 and the first rear bottom rod 22, the first front turnover rod 25 can rotate relative to the first front bottom rod 21, and the first rear turnover rod 26 can rotate relative to the first rear bottom rod 22, so that an upper end of the first turnover body 200 is flipped downward relative to a lower end thereof toward a direction away from the storage chamber 101. The first side-bracket 2 can not only achieve not only folding and unfolding function but also flip-open function, which is more convenient to use.

Furthermore, the first connecting assembly 27 includes a first front diagonal rod 271, a first rear diagonal rod 272, and a first pivot mechanism 273. A front end of the first front diagonal rod 271 is pivotally connected to a front end of the first front turnover rod 25, and a rear end of the first rear diagonal rod 272 is pivotally connected to a rear end of the first rear turnover rod 26. The first pivot mechanism 273 is respectively connected to a rear end of the first front top rod 23, a front end of the first rear top rod 24, a rear end of the first front diagonal rod 271, and a front end of the first rear diagonal rod 272, and enables the four ends to be pivotally connected to each other. On one hand, the first front diagonal rod 271 and the first rear diagonal rod 272 enhance the overall support strength of the first side-bracket 2. On the other hand, through the first front diagonal rod 271, the first rear diagonal rod 272, and the first pivot mechanism 273, the connection among the first front top rod 23, the first rear top rod 24, the first front turnover rod 25, and the first rear turnover rod 26 is achieved, thereby forming a structurally stable first turnover body 200.

Furthermore, the first connecting assembly 27 further includes a first front top pivot seat 274 provided between the first pivot mechanism 273 and the first front top rod 23, and a first rear top pivot seat 275 provided between the first pivot mechanism 273 and the first rear top rod 24. A front end of the first front top pivot seat 274 is pivotally connected to a rear end of the first front top rod 23, and a rear end of the first front top pivot seat 274 is pivotally connected to the first pivot mechanism 273. A rear end of the first rear top pivot seat 275 is pivotally connected to the front end of the first rear top rod 24, and a front end of the first rear top pivot seat 275 is pivotally connected to the first pivot mechanism 273. The first connecting assembly 27 further includes a first front support rod 276, and a first rear support rod 277. An upper end of the first front support rod 276 is pivotally connected to the first front top pivot seat 274, and a lower end of the first front support rod 276 is pivotally connected to a rear end of the first front turnover rod 25. An upper end of the first rear support rod 277 is pivotally connected to the first rear top pivot seat 275, and a lower end of the first rear support rod 277 is pivotally connected to a front end of the first rear turnover rod 26.

The first pivot mechanism 273 includes a first front top joint pivotally connected to the first front top pivot seat 274, a first rear top joint pivotally connected to the first rear top pivot seat 275, a first front diagonal joint pivotally connected to the first front diagonal rod 271, and a first rear diagonal joint pivotally connected to the first rear diagonal rod 272.

When the first side-bracket 2 is in an unfolded state, in the first pivot mechanism 273, the first front top joint and the first rear top joint are arranged horizontally, and the first front diagonal joint and the first rear diagonal joint are arranged diagonally. When the first side-bracket 2 transitions from the unfolded state to a folded state, in the first pivot mechanism 273, an end of the first front top joint pivotally connected to the first front top pivot seat 274 and an end of the first rear top joint pivotally connected to the first rear top pivot seat 275 gradually move upward and closer to each other, and an end of the first front diagonal joint pivotally connected to the first front diagonal rod 271 and an end of the first rear diagonal joint pivotally connected to the first rear diagonal rod 272 gradually move downward and closer to each other, enabling the four components to form an "X" shape. At this time, the first front top pivot seat 274 and the first rear top pivot seat 275 move upward accordingly and drives the rear end of the first front top rod 23 and the front end of the first rear top rod 24 to move upward. Simultaneously, the first front support rod 276 and the first rear support rod 277 are driven to move upward, thus to drive the rear end of the first front turnover rod 25 and the front end of the first rear turnover rod 26 to move upward, thereby further driving the rear end of the first front bottom rod 21 and the front end of the first rear bottom rod 22 to move upward. The first connecting assembly 27 not only serves to connect the first front top rod 23, the first rear top rod 24, the first front turnover rod 25, and the first rear turnover rod 26 but also drives the relative rotation of the first front bottom rod 21 and the first rear bottom rod 22, as well as the relative rotation of the first front top rod 23 and the first rear top rod 24, which promotes the linkage of the four components, so that the folding and unfolding can be completed in a single step.

Furthermore, in some embodiments, the rear end of the first front bottom rod 21 is directly and pivotally connected to the front end of the first rear bottom rod 22.

Furthermore, in some embodiment, the rear end of the first front bottom rod 21 is pivotally connected to the front end of the first rear bottom rod 22 through the first front bottom pivot pipe 211 and the first rear bottom pivot seat 221. Specifically, the rear end of the first front bottom rod 21 is provided with the first front bottom pivot pipe 211, the front end of the first rear bottom rod 22 is provided with the first rear bottom pivot seat 221, and the first rear bottom pivot seat 221 is pivotally connected to the middle portion of the first front bottom pivot pipe 211. When the first side-bracket 2 is unfolded, the first front bottom pivot pipe 211 abuts against the upper surface of the first rear bottom pivot seat 221.

Figure 2:
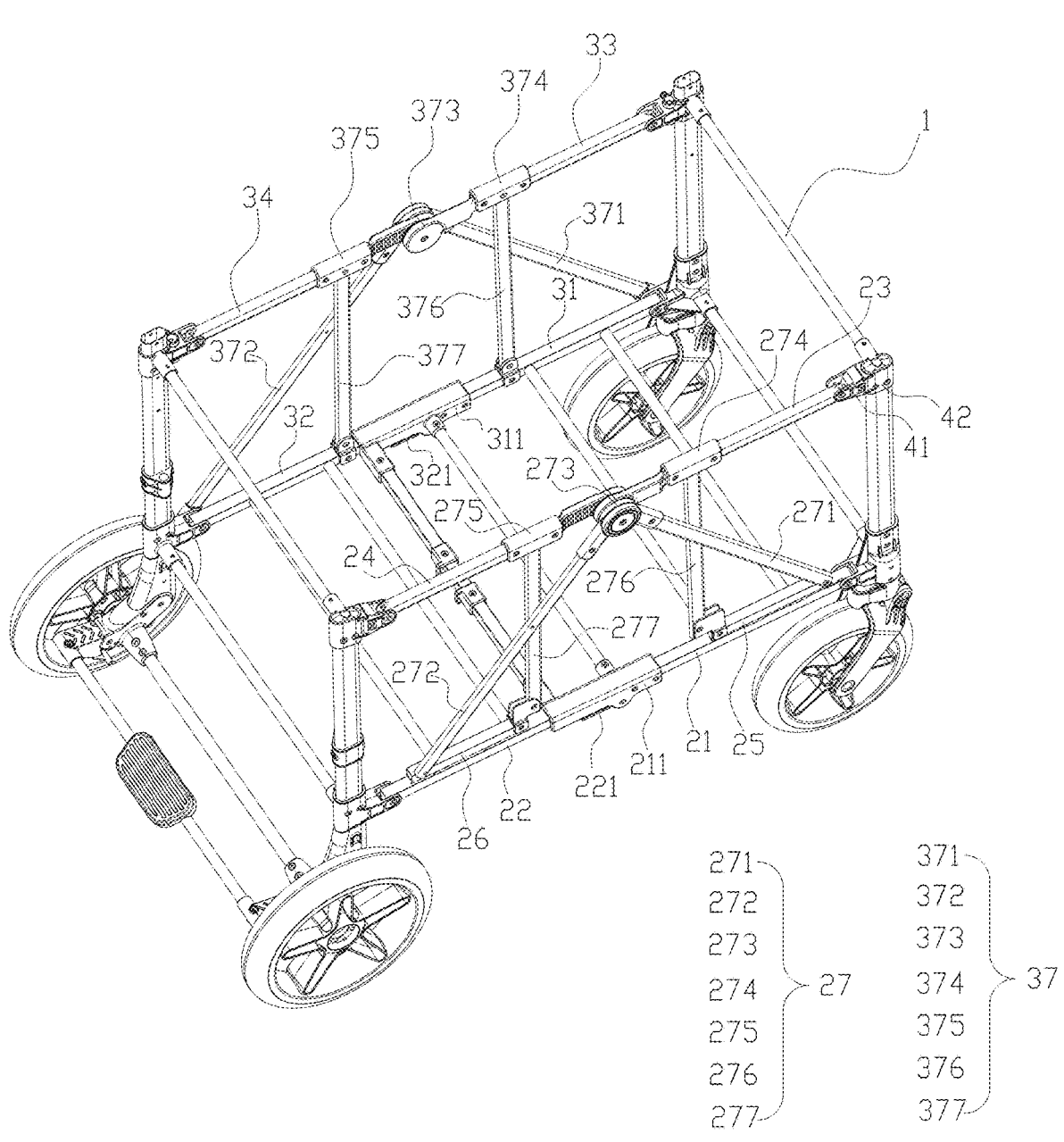
FIG. 2 is a schematic structural diagram showing that the first side-bracket of the cart capable of being laterally opened is flipped and opened, wherein the first side-opening is in a closed state, according to the embodiment of the present invention.
Figure 3:
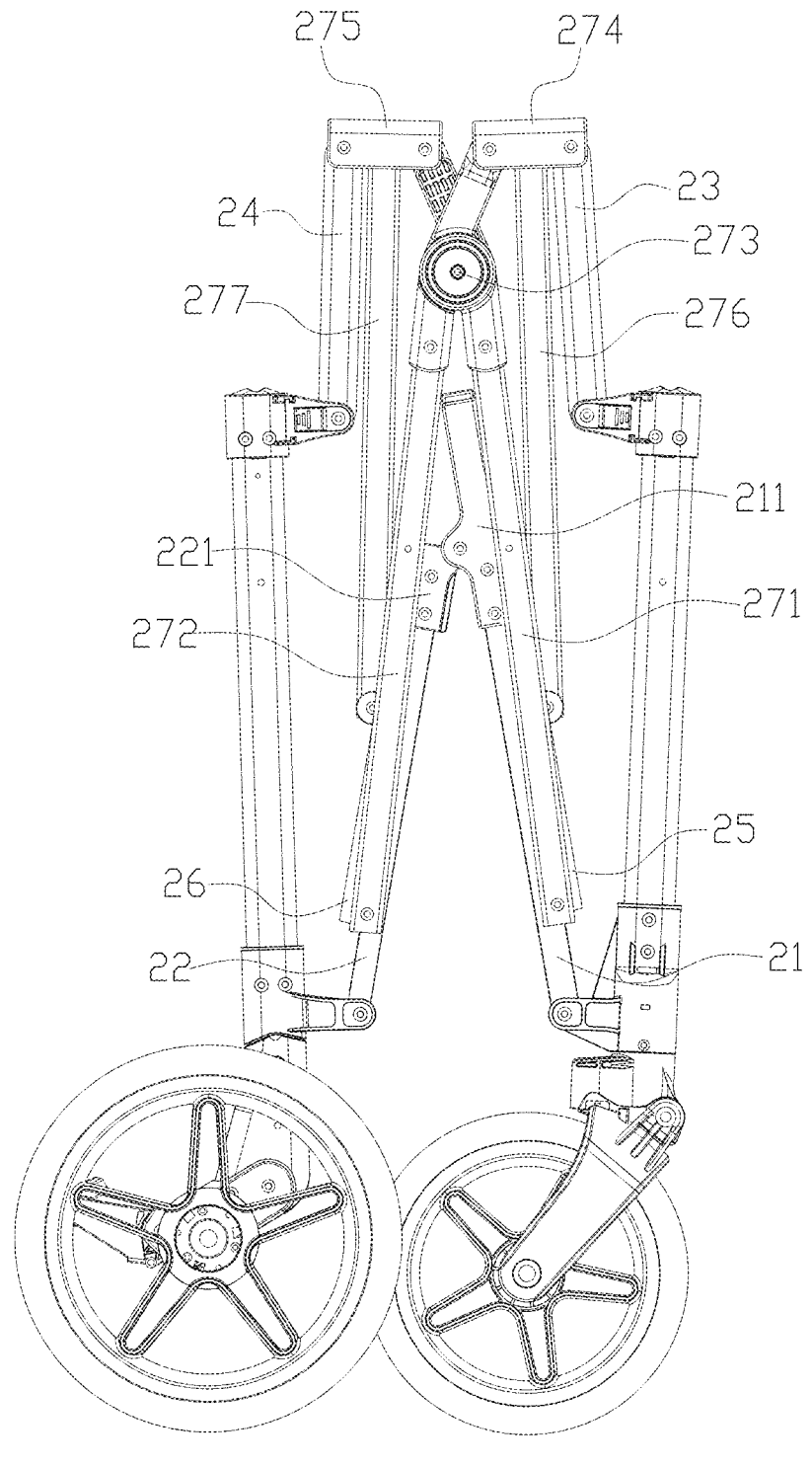
FIG. 3 is a schematic structural diagram showing that the first and second side-brackets of the cart capable of being laterally opened are flipped and opened, wherein the cart is in a folded state, according to the embodiment of the present invention.

In some embodiment, as shown in FIGS. 1-3, the second side-bracket 3 only features folding and unfolding functions and does not have a flip-open capability. Specifically, the second side-bracket 3 includes a second front bottom rod 31, a second rear bottom rod 32, a second front top rod 33, and a second rear top rod 34. The second front bottom rod 31 is pivotally connected to the second rear bottom rod 32, and the second front top rod 33 is pivotally connected to the second rear top rod 34. A pivot axis of the second front bottom rod 31 and the second rear bottom rod 32 is parallel to a pivot axis of the second front top rod 33 and the second rear top rod 34. The second front bottom rod 31 can rotate relative to the second rear bottom rod 32, and the second front top rod 33 can rotate relative to the second rear top rod 34, so as to fold or unfold the second side-bracket 3.

Furthermore, the second side-bracket 3 further includes a second connecting assembly 37; wherein the second connecting assembly 37 includes a second front diagonal rod 371, a second rear diagonal rod 372, and a second pivot mechanism 373. A front end of the second front diagonal rod 371 is pivotally connected to a front end of the second front bottom rod 31, and a rear end of the second rear diagonal rod 372 is pivotally connected to a rear end of the second rear bottom rod 32. The second pivot mechanism 373 is respectively connected to a rear end of the second front top rod 33, a front end of the second rear top rod 34, a rear end of the second front diagonal rod 371, and a front end of the second rear diagonal rod 372, and enables the four ends to be pivotally connected to each other. On one hand, the second front diagonal rod 371 and the second rear diagonal rod 372 enhance the overall support strength of the second side-bracket 3. On the other hand, through the second front diagonal rod 371, the second rear diagonal rod 372, and the second pivot mechanism 373, the connection among the second front top rod 33, the second rear top rod 34, the second front bottom rod 31, and the second rear bottom rod 32 is achieved, thereby forming a structurally stable second side-bracket 3.

Furthermore, in some embodiment, the second connecting assembly 37 further includes a second front top pivot seat 374 provided between the second pivot mechanism 373 and the second front top rod 33, and a second rear top pivot seat 375 provided between the second pivot mechanism 373 and the second rear top rod 34. A front end of the second front top pivot seat 374 is pivotally connected to a rear end of the second front top rod 33, and a rear end of the second front top pivot seat 374 is pivotally connected to the second pivot mechanism 373. A rear end of the second rear top pivot seat 375 is pivotally connected to a front end of the second rear top rod 34, and a front end of the second rear top pivot seat 375 is pivotally connected to the second pivot mechanism 373. The second connecting assembly 37 further includes a second front support rod 376, and a second rear support rod 377. An upper end of the second front support rod 376 is pivotally connected to the second front top pivot seat 374, and a lower end of the second front support rod 376 is pivotally connected to a rear end of the second front bottom rod 31. An upper end of the second rear support rod 377 is pivotally connected to the second rear top pivot seat 375, and a lower end of the second rear support rod 377 is pivotally connected to a front end of the second rear bottom rod 32.

The second pivot mechanism 373 includes a second front top joint pivotally connected to the second front top pivot seat 374, a second rear top joint pivotally connected to the second rear top pivot seat 375, a second front diagonal joint pivotally connected to the second front diagonal rod 371, and a second rear diagonal joint pivotally connected to the second rear diagonal rod 372.

When the second side-bracket 3 is in an unfolded state, in the second pivot mechanism 373, the second front top joint and the second rear top joint are arranged horizontally, and the second front diagonal joint and the second rear diagonal joint are arranged diagonally. When the second side-bracket 3 transitions from the unfolded state to a folded state, in the second pivot mechanism 373, an end of the first front top joint pivotally connected to the second front top pivot seat 374 and an end of the first rear top joint pivotally connected to the second rear top pivot seat 375 gradually move upward and closer to each other, and an end of the second front diagonal joint pivotally connected to the second front diagonal rod 371 and an end of the second rear diagonal joint pivotally connected to the second rear diagonal rod 372 gradually move downward and closer to each other, enabling the four components to form an "X" shape. At this time, the second front top pivot seat 374 and the second rear top pivot seat 375 move upward accordingly and drives the rear end of the second front top rod 33 and the front end of the second rear top rod 34 to move upward. Simultaneously, the second front support rod 376 and the second rear support rod 377 are driven to move upward, thereby driving the rear end of the second front bottom rod 31 and the front end of the second rear bottom rod 32 to move upward. The second connecting assembly 37 not only serves to connect the second front top rod 33, the second rear top rod 34, the second front bottom rod 31, and the second rear bottom rod 32, but also drives the relative rotation of the second front bottom rod 31 and the second rear bottom rod 32, as well as the relative rotation of the second front top rod 33 and the second rear top rod 34, which promotes the linkage of the four components, so that the folding and unfolding can be completed in a single step.

Furthermore, in some embodiments, the rear end of the second front bottom rod 31 is directly and pivotally connected to the front end of the second rear bottom rod 32.

Furthermore, in some embodiments, the rear end of the second front bottom rod 31 is pivotally connected to the front end of the second rear bottom rod 32 through a second front bottom pivot pipe 311 and a second rear bottom pivot seat 321. Specifically, the rear end of the second front bottom rod 31 is provided with the second front bottom pivot pipe 311, and the front end of the second rear bottom rod 32 is provided with the second rear bottom pivot seat 321. The second rear bottom pivot seat 321 is pivotally connected to a middle portion of the second front bottom pivot pipe 311. When the second side-bracket 3 is unfolded, the second front bottom pivot pipe 311 abuts against an upper surface of the second rear bottom pivot seat 321.

In the first side-bracket 2, a front end of the first front top rod 23 and a rear end of the first rear top rod 24 are pivotally and detachably connected to an upper portion of the main frame 1, respectively, and a front end of the first front bottom rod 21 and a rear end of the first rear bottom rod 22 are pivotally connected to the lower part of the main frame 1, respectively. Correspondingly, in the second side-bracket 3, a front end of the second front top rod 33 and a rear end of the second rear top rod 34 are pivotally connected to the upper portion of the main frame 1, respectively, and a front end of the second front bottom rod 31 and a rear end of the second rear bottom rod 32 are pivotally connected to the lower portion of the main frame 1, respectively. When the first side-bracket 2 and the second side-bracket 3 are folded synchronously, they drive the entire cart body 100 to fold. Conversely, when the first side-bracket 2 and the second side-bracket 3 are unfolded synchronously, they drive the entire cart body 100 to unfold.

Figure 6:
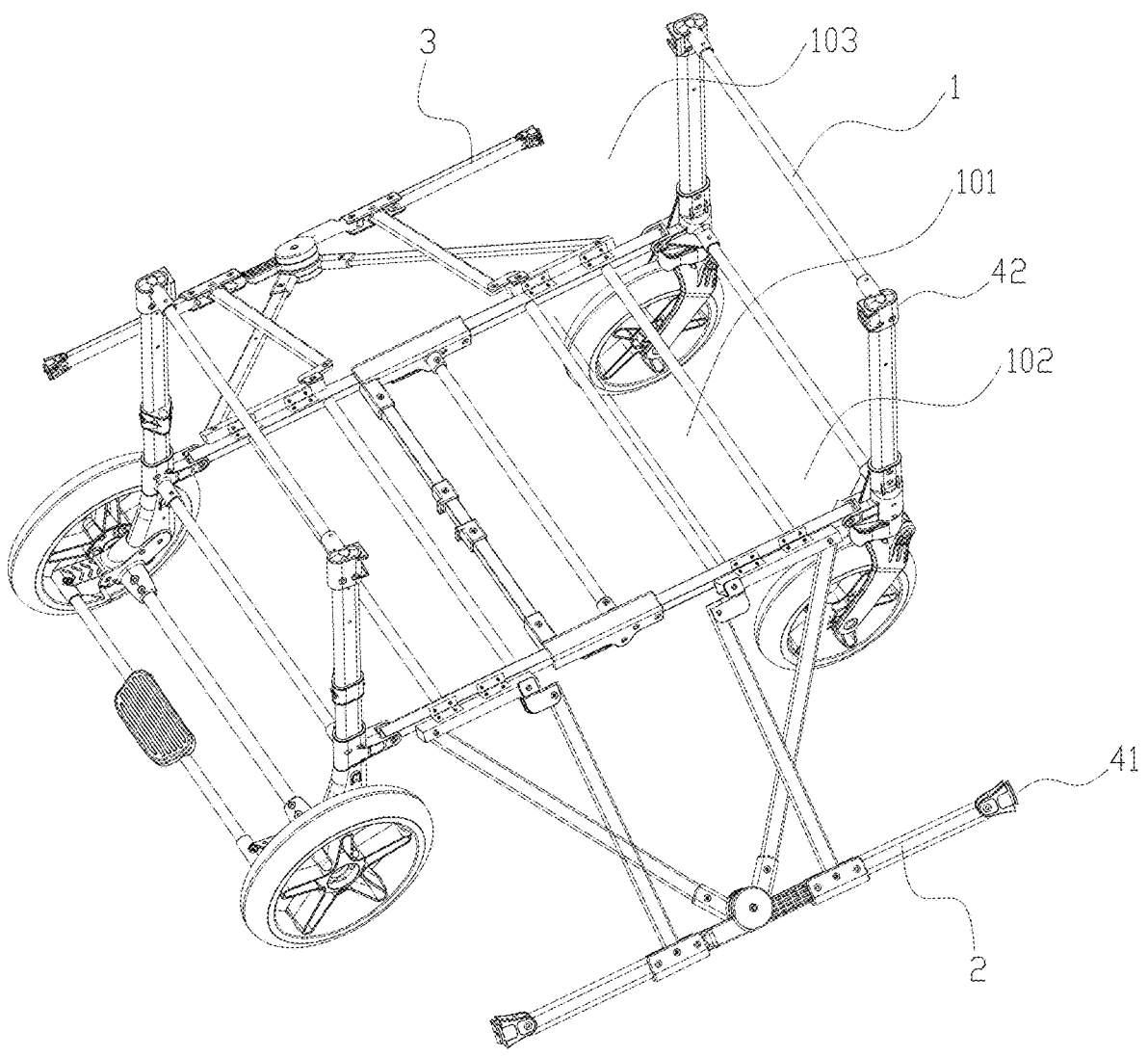
FIG. 6 is a schematic structural diagram showing that the first and second side-brackets of the cart capable of being laterally opened are flipped and opened, wherein a first side-opening and a second side-opening are in open states, according to the embodiment of the present invention.
Figure 7:
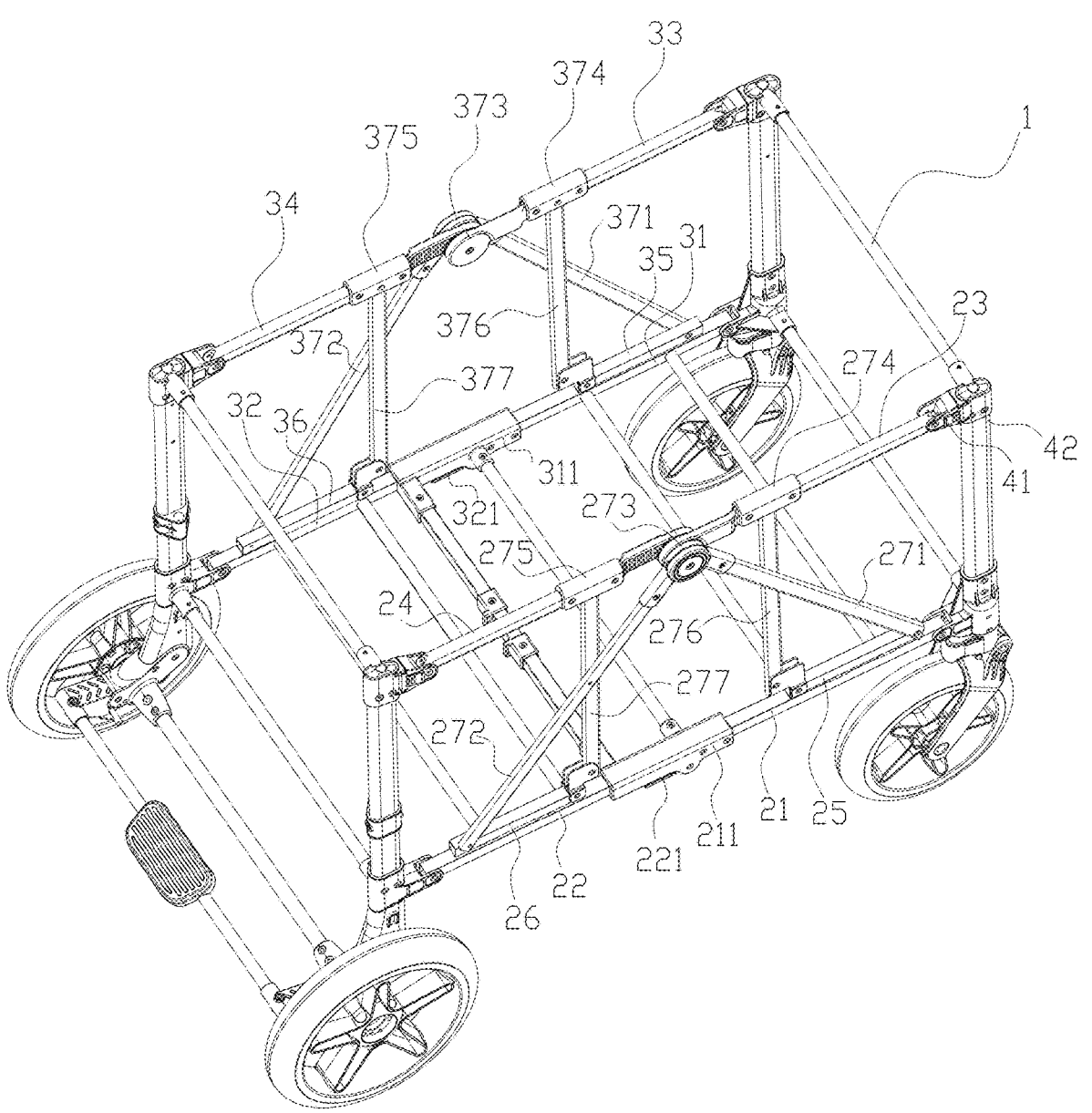
FIG. 7 is a schematic structural diagram showing that the first and second side-brackets of the cart capable of being laterally opened are flipped and opened, wherein the first side-opening and the second side-opening are in closed states, according to the embodiment of the present invention.

Furthermore, as shown in FIGS. 6-7, in some embodiments, the second side-bracket 3 not only features the folding and unfolding functions but also incorporates the flip-open capability. Specifically, the second side-bracket 3 includes a second front bottom rod 31, a second rear bottom rod 32, a second front top rod 33, and a second rear top rod 34. The second front bottom rod 31 is pivotally connected to the second rear bottom rod 32, and the second front top rod 33 is pivotally connected to the second rear top rod 34. A pivot axis of the second front bottom rod 31 and the second rear bottom rod 32 is parallel to a pivot axis of the second front top rod 33 and the second rear top rod 34. The second front bottom rod 31 can rotate relative to the second rear bottom rod 32, and the second front top rod 33 can rotate relative to the second rear top rod 34, so as to fold or unfold the second side-bracket 3. The second side-bracket 3 further includes a second front turnover rod 35, a second rear turnover rod 36, and a second connecting assembly 37, wherein the second front turnover rod 35 is parallel to and hinged with the second front bottom rod 31, and the second rear turnover rod 36 is parallel to and hinged with the second rear bottom rod 32. The second connecting assembly 37 interconnects the second front top rod 33, the second rear top rod 34, the second front turnover rod 35, and the second rear turnover rod 36, so as to form a second turnover unit. When an articulated shaft of the second front turnover rod 35 and the second front bottom rod 31 is coaxial with an articulated shaft of the second rear turnover rod 36 and the second rear bottom rod 32, the second front turnover rod 35 can rotate relative to the second front bottom rod 31, and the second rear turnover rod 36 can rotate relative to the second rear bottom rod 32, so that an upper end of the second turnover body is flipped downward relative to a lower end thereof toward a direction away from the storage chamber 101.

Furthermore, the second connecting assembly 37 includes a second front diagonal rod 371, a second rear diagonal rod 372, and a second pivot mechanism 373. A front end of the second front diagonal rod 371 is pivotally connected to a front end of the second front turnover rod 35, and a rear end of the second rear diagonal rod 372 is pivotally connected to a rear end of the second rear turnover rod 36. The second pivot mechanism 373 is respectively connected to a rear end of the second front top rod 33, a front end of the second rear top rod 34, a rear end of the second front diagonal rod 371, and a front end of the second rear diagonal rod 372, and enables the four ends to be pivotally connected to each other. On one hand, the second front diagonal rod 371 and second rear diagonal rod 372 enhance the overall support strength of the second side-bracket 3. On the other hand, through the second front diagonal rod 371, the second rear diagonal rod 372, and the second pivot mechanism 373, the connection among the second front top rod 33, the second rear top rod 34, the second front turnover rod 35, and the second rear turnover rod 36 is achieved, thereby forming a structurally stable first turnover body 200.

Furthermore, the second connecting assembly 37 further includes a second front top pivot seat 374 provided between the second pivot mechanism 373 and the second front top rod 33, and a second rear top pivot seat 375 provided between the second pivot mechanism 373 and the second rear top rod 34. A front end of the second front top pivot seat 374 is pivotally connected to a rear end of the second front top rod 33, a rear end of the second front top pivot seat 374 is pivotally connected to the second pivot mechanism 373, a rear end of the second rear top pivot seat 375 is pivotally connected to a front end of the second rear top rod 34, and a front end of the second rear top pivot seat 375 is pivotally connected to the second pivot mechanism 373. The second connecting assembly 37 further includes a second front support rod 376, and a second rear support rod 377. An upper end of the second front support rod 376 is pivotally connected to the second front top pivot seat 374, a lower end of the second front support rod 376 is pivotally connected to a rear end of the second front turnover rod 35, an upper end of the second rear support rod 377 is pivotally connected to the second rear top pivot seat 375, and a lower end of the second rear support rod 377 is pivotally connected to a front end of the second rear turnover rod 36.

The second pivot mechanism 373 includes a second front top joint pivotally connected to the second front top pivot seat 374, a second rear top joint pivotally connected to the second rear top pivot seat 375, a second front diagonal joint pivotally connected to the second front diagonal rod 371, and a second rear diagonal joint pivotally connected to the second rear diagonal rod 372.

When the second side-bracket 3 is in an unfolded state, in the second pivot mechanism 373, a second front top joint and a second rear top joint of the second pivot mechanism 373 are arranged horizontally, and a second front diagonal joint and the second rear diagonal joint are arranged diagonally. When the second side-bracket 3 transitions from the unfolded state to a folded state, in the second pivot mechanism 373, an end of the second front top joint pivotally connected to the second front top pivot seat 374 and an end of the second rear top joint pivotally connected to the second rear top pivot seat 375 gradually move upward and closer to each other. Simultaneously, the end of the second front oblique joint pivotally connected to the second front oblique rod 371 and the end of the second rear oblique joint pivotally connected to the second rear oblique rod 372 gradually move downward and closer to each other, enabling the four components to form an "X" shape. At this time, the second front top pivot seat 374 and the second rear top pivot seat 375 move upward accordingly and drives the rear end of the second front top rod 33 and the front end of the second rear top rod 34 to move upward. Simultaneously, the second front support rod 376 and the second rear support rod 377 are driven to move upward, thus to drive the rear end of the second front turnover rod 35 and the front end of the second rear turnover rod 36 to move upward, thereby further driving the rear end of the second front bottom rod 31 and the front end of the second rear bottom rod 32 to move upward. The second connecting assembly 37 not only serves to connect the second front top rod 33, the second rear top rod 34, the second front turnover rod 35, and the second rear turnover rod 36, but also drives the relative rotation of the second front bottom rod 31 and the second rear bottom rod 32, as well as the relative rotation of the second front top rod 33 and the second rear top rod 34, which promotes the linkage of the four components, so that the folding and unfolding can be completed in a single step.

Furthermore, in some embodiments, the rear end of the second front bottom rod 31 is directly and pivotally connected to the front end of the second rear bottom rod 32.

Furthermore, in some embodiments, the rear end of the second front bottom rod 31 is pivotally connected to the front end of the second rear bottom rod 32 through a second front bottom pivot pipe 311 and a second rear bottom pivot seat 321. Specifically, the rear end of the second front bottom rod 31 is provided with the second front bottom pivot pipe 311, and the front end of the second rear bottom rod 32 is provided with the second rear bottom pivot seat 321. The second rear bottom pivot seat 321 is pivotally connected to a middle portion of the second front bottom pivot pipe 311. When the second side-bracket 3 is unfolded, the second front bottom pivot pipe 311 abuts against an upper surface of the second rear bottom pivot seat 321.

In the first side-bracket 2, the front end of the first front top rod 23 and the rear end of the first rear top rod 24 are respectively pivotally and detachably connected to the upper portion of the main frame 1, and the front end of the first front bottom rod 21 and the rear end of the first rear bottom rod 22 are respectively pivotally connected to the lower portion of the main frame 1. Correspondingly, in the second side-bracket 3, the front end of the second front top rod 33 and the rear end of the second rear top rod 34 are respectively pivotally and detachably connected to the upper portion of the main frame 1, and the front end of the second front bottom rod 31 and the rear end of the second rear bottom rod 32 are respectively pivotally connected to the lower portion of the main frame 1. When the first side-bracket 2 and the second side-bracket 3 are folded synchronously, they drive the entire cart body 100 to fold. Conversely, when the first side-bracket 2 and the second side-bracket 3 are unfolded synchronously, they drive the entire cart body 100 to unfold.

A locking device 4 is provided between the first side-bracket 2 and the main frame 1 and/or between the second side-bracket 3 and the main frame 1. The locking device 4 includes a first locking seat 41 and a second locking seat 42. One of the first locking seat 41 and the second locking seat 42 is provided on the first side-bracket 2 and/or the second side-bracket 3, while the other is provided on the main frame 1.

In some embodiments, the first locking seat 41 and the second locking seat 42 are connected by insertion. For example, the first locking seat 41 is provided with either an insertion block or an insertion slot, while the second locking seat 42 is provided with the other corresponding component (i.e., insertion block or an insertion slot), when the insertion block is engaged with insertion slot, the first locking seat 41 and the second locking seat 42 are locked together.

In some embodiments, the first locking seat 41 and the second locking seat 42 are connected by a snap-fit connection. For example, the first locking seat 41 is provided with either a snap hook or a clamping slot, and the second locking seat 42 is provided with the other corresponding component (i.e., the snap hook or the clamping slot), when the snap hook is engaged with the clamping slot, the first locking seat 41 and the second locking seat 42 are locked together.

In some embodiments, the first locking seat 41 and the second locking seat 42 are connected by the locking member 43.

Specifically, the first locking seat 41 is provided with a first locking hole 411, and the second locking seat 42 is provided with a second locking hole 421. The locking member 43 passes through the first locking hole 411 and extends into the second locking hole 421, so as to connect the first locking seat 41 with the second locking seat 42, wherein the locking member 43 is a pin. When the locking member 43 is inserted into the first locking hole 411 and the second locking hole 421 at the same time, the first locking seat 41 and the second locking seat 42 are locked, so that the first side-bracket 2 and the main frame 1 or the second side-bracket 3 and the main frame 1 is locked. When the locking member 43 withdraws from either the first locking hole 411 or the second locking hole 421, the first locking seat 41 and the second locking seat 42 are unlocked, so that the first side-bracket 2 and the main frame 1 or the second side-bracket 3 and the main frame 1 are unlocked. This structure is simple, and both locking and unlocking operations are convenient.

Figure 4:
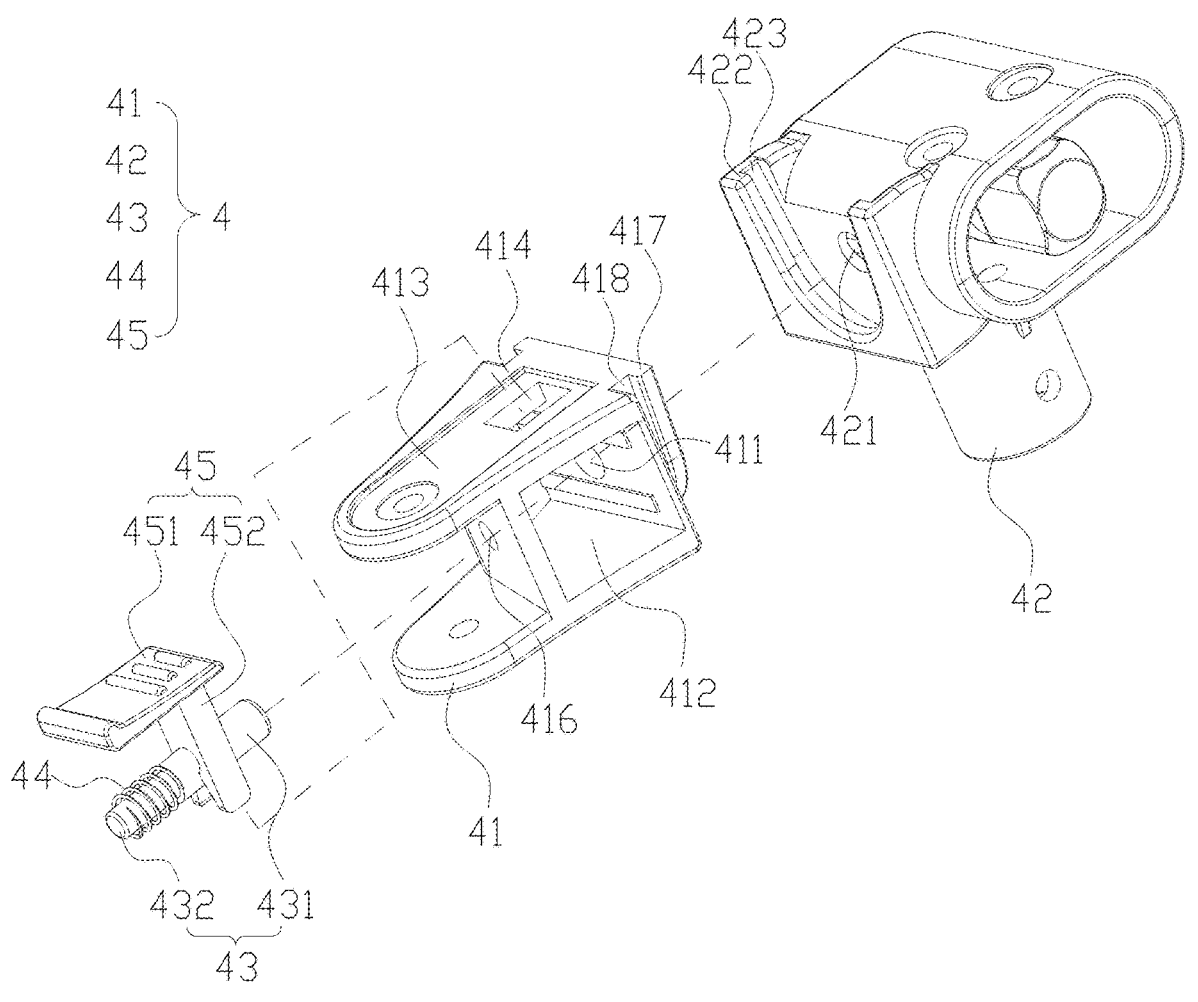
FIG. 4 is an exploded view of a locking device of the cart capable of being laterally opened according to the embodiment of the present invention.
Figure 5:
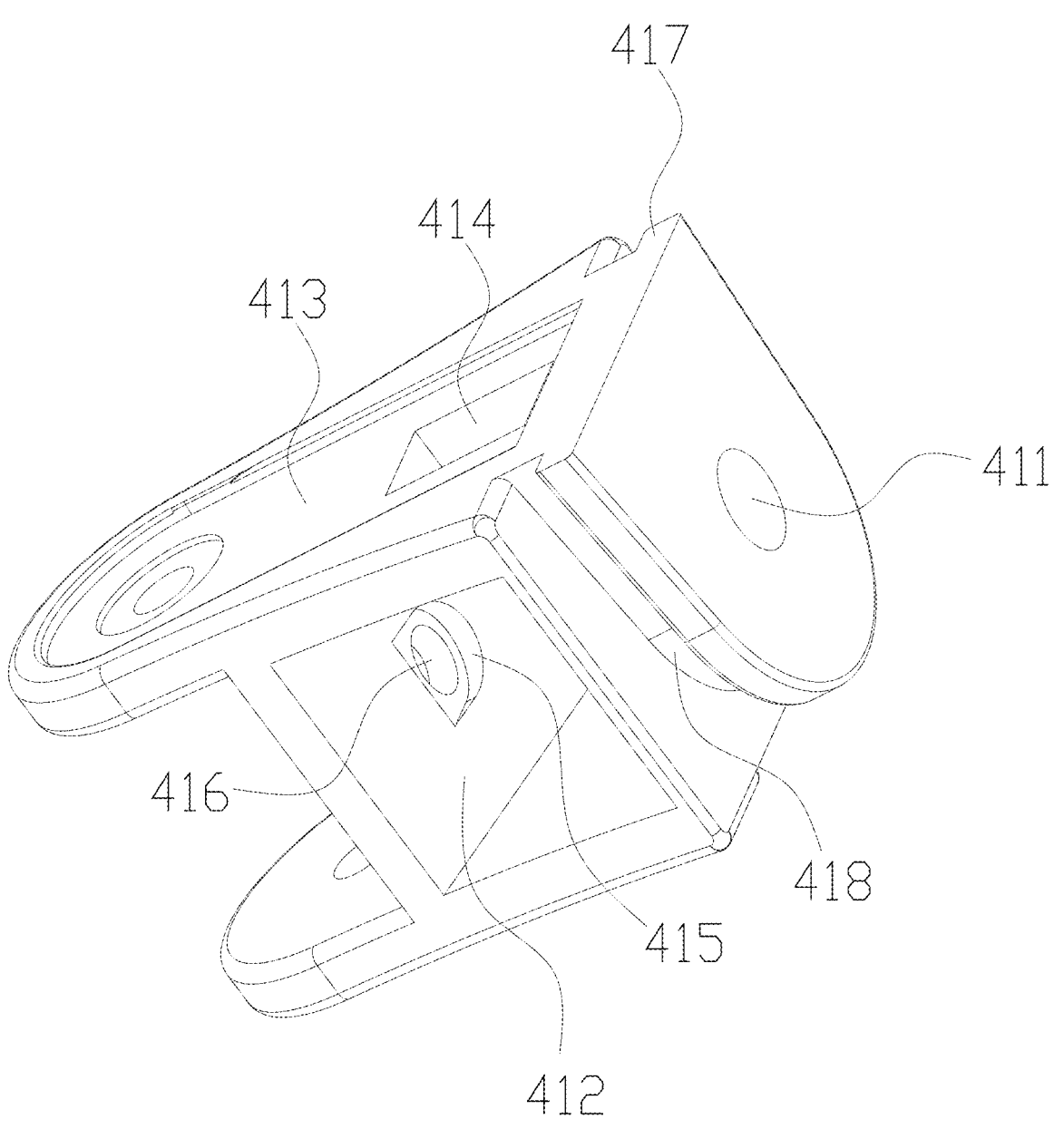
FIG. 5 is a schematic structural diagram of a first locking seat of the cart capable of being laterally opened according to the embodiment of the present invention.

Furthermore, as shown in FIGS. 4-5, in some embodiments, the first locking seat 41 is provided with a mounting groove 412, the mounting groove 412 is provided on a side of the first locking hole 411 and communicated with the first locking hole 411. The locking member 43 is movably arranged within the mounting groove 412, one end of the locking member 43 penetrates into the first locking hole 411, and a self-locking spring 44 is provided between the other end of the locking member 43 and a sidewall of the mounting groove 412. The self-locking spring 44 has a tendency to drive the locking member 43 to move toward a direction of extending into the second locking hole 421. An unlocking module 45 is provided on the locking member 43. When the unlocking module 45 is driven to move toward a direction away from the second locking hole 421, the locking member 43 is driven to withdraw from the second locking hole 421. When the first locking seat 41 and the second locking seat 42 need to be disconnected, the unlocking module 45 is moved toward the direction away from the second locking hole 421 to drive the locking member 43 to withdraw from the second locking hole 421, thereby releasing the connection between the first locking seat 41 and the second locking seat 42. When the first locking seat 41 and the second locking seat 42 need to be connected and locked, the unlocking module 45 is first moved toward a direction away from the second locking hole 421, so that the first locking hole 411 is coaxially aligned with the second locking hole 421, and then the unlocking module 45 is released. At this time, the self-locking spring 44 drives the locking member 43 to move toward a direction of extending into the second locking hole 421 and maintains a continuous pushing force to keep the locking member 43 moving toward the direction of extending into the second locking hole 421, thus to connect the first locking seat 41 and the second locking seat 42 and keep a locked state. The locking and unlocking operations are simple, which is very convenient to use.

Furthermore, in some embodiments, the first locking seat 41 is provided with a limiting chute 413, and a through hole 414 that communicates the limiting chute 413 with the mounting groove 412. A longitudinal direction of the limiting chute 43 is coaxial with an axial direction of the first locking hole 411. The unlocking module 45 includes a dragging portion 451 and a connecting portion 452, wherein the dragging portion 451 is movably provided within the limiting chute 413, one end of the connecting portion 452 is fixedly connected to the locking member 43, and the other end of the connecting portion 452 passes through the through hole 414 and then fixedly connected to the dragging portion 451. The limiting chute 413 can effectively provide directional guidance for the movement of the dragging portion 451. Through the limit coordination between the dragging portion 451 and the limiting chute 413, the movement stability of the dragging portion 451 can be effectively improved, thereby enhancing the movement stability of the locking member 43. This provides smoother locking and unlocking between the first locking seat 41 and the second locking seat 42.

Furthermore, in some embodiments, the locking member 43 includes a locking portion 431, and a sleeve portion 432, wherein the locking portion 431 has a diameter greater than that of the sleeve portion 432. The sidewall of the mounting groove 412 is provided with a positioning groove 415 and a positioning hole 416 that are both coaxial with the first locking hole 411. One end of the locking member 43 penetrates into the first locking hole 411, and the other end of the locking member 43 is engaged with the positioning hole 416. The self-locking spring 44 is sleeved around the sleeve portion 432, one end of the self-locking spring 44 abuts against the locking portion 431, and the other end of the self-locking spring 44 abuts against the positioning groove 415, so that the locking member 43 is stably installed between the first locking hole 411 and the positioning hole 416, and the self-locking spring 44 is stably installed between the locking member 43 and the positioning groove 415.

Furthermore, in some embodiments, the first locking seat 41 is provided with a first insertion plate 417, and a first insertion slot 41; the second locking seat 42 is provided with a second insertion plate 422, and a second insertion slot 423. When the first locking seat 41 is connected to the second locking seat 42, the first insertion plate 417 is engaged with the second insertion slot 423, and the second insertion plate 422 is engaged with the first insertion slot 418. When the first insertion plate 417 is engaged with the second insertion slot 423 and the second insertion plate 422 is engaged with the first insertion slot 418, the first locking seat 41 and the second locking seat 42 are plugged together. This facilitates the coaxial alignment of the first locking hole 411 and the second locking hole 421, thereby enabling the locking member 43 to securely lock the first locking seat 41 and the second locking seat 42.

It should be understood that the terms "first" "second", etc., are used in the present invention to describe various information, but the information should not be limited to these terms, and these terms are only used to distinguish the same type of information from each other. For example, in the case of without departing from the scope of the present disclosure, a "first" information may also be called a "second" information, and similarly, the "second" information may also be called the "first" information. In addition, the terms "center", "upper", "lower", "left", "right", "vertical", "horizontal", "inner", "outer", etc. indicate an orientation or positional relationship based on the drawings. The orientation or positional relationship shown is only to facilitate the description of the present invention and simplify the description, and does not indicate or imply that the device or element referred to must have a specific orientation, or be constructed and operated in a specific orientation, and therefore cannot be understood as limiting the scope of the present invention.

The above are preferred embodiments of the present invention. It should be pointed out that for those of ordinary skill in the art, several improvements and deformations can be made without departing from the principles of the present invention, and these improvements and deformations are also regarded as the protection scope of the present invention.

What is claimed is:

1. A cart capable of being laterally opened, comprising a cart body, wherein the cart body comprises a main frame1 and a first side-bracket arranged on one side of the main frame, a storage chamber is formed between the main frame and the first side-bracket, and the first side-bracket is detachably connected to the main frame;

when the first side-bracket is disconnected from the main frame, an upper end of the first side-bracket is flipped downward relative to a lower end thereof toward a direction away from the storage chamber, such that a first side-opening communicated with the storage chamber is formed at the side of the main frame, wherein the first side-bracket includes a first front bottom rod, a first rear bottom rod, a first front top rod, and a first rear top rod; wherein the first front bottom rod is pivotally connected to the first rear bottom rod, and the first front top rod is pivotally connected to the first rear top rod;

when a pivot axis of the first front bottom rod and the first rear bottom rod is parallel to a pivot axis of the first front top rod and first rear top rod, the first front bottom rod is configured to rotate relative to the first rear bottom rod, and the first front top rod is configured to rotate relative to the first rear top rod, such that the first side-bracket is folded or unfolded;

the first side-bracket further includes a first front turnover rod, a first rear turnover rod and a first connecting assembly; the first front turnover rod is parallel to and hinged with the first front bottom rod, and the first rear turnover rod is parallel to and hinged with the first rear bottom rod;

the first connecting assembly interconnects the first front top rod, the first rear top rod, the first front turnover rod and the first rear turnover rod, such that a first turnover body is formed;

when an articulated shaft of the first front turnover rod and first front bottom rod is coaxial with an articulated shaft of the first rear turnover rod and first rear bottom rod, the first front turnover rod is configured to rotate relative to the first front bottom rod, and the first rear turnover rod is configured to rotate relative to the first rear bottom rod, such that an upper end of the first turnover body is flipped downward relative to a lower end thereof toward a direction away from the storage chamber.

2. The cart according to claim 1, further comprising a second side-bracket provided on the other side of the main frame, wherein the first side-bracket and the second side-bracket are configured be folded or unfolded at the same time, such that the cart body is driven to fold or unfold.

3. The cart according to claim 2, wherein the second side-bracket is detachably connected to the main frame, when the second side-bracket is disconnected from the main frame, an upper end of the second side-bracket is flipped downward relative to a lower end thereof toward a direction away from the storage chamber, such that a second side-opening communicated with the storage chamber is formed at the other side of the main frame.

4. The cart according to claim 1, wherein the first connecting assembly includes a first front diagonal rod, a first rear diagonal rod, and a first pivot mechanism; a front end of the first front diagonal rod is pivotally connected to a front end of the first front turnover rod, a rear end of the first rear diagonal rod is pivotally connected to a rear end of the first rear turnover rod; and the first pivot mechanism is respectively connected to a rear end of the first front top rod, a front end of the first rear top rod, a rear end of the first front diagonal rod, and a front end of the first rear diagonal rod, and enables the four ends to be pivotally connected to each other.

5. The cart according to claim 4, wherein the first connecting assembly further includes a first front top pivot seat provided between the first pivot mechanism and the first front top rod, and a first rear top pivot seat provided between the first pivot mechanism and the first rear top rod;

a front end of the first front top pivot seat is pivotally connected to the rear end of the first front top rod, a rear end of the first front top pivot seat is pivotally connected to the first pivot mechanism; a rear end of the first rear top pivot seat is pivotally connected to the front end of the first rear top rod, and a front end of the first rear top pivot seat is pivotally connected to the first pivot mechanism;

the first connecting assembly further includes a first front support rod, and a first rear support rod; an upper end of the first front support rod is pivotally connected to the first front top pivot seat, and a lower end of the first front support rod is pivotally connected to a rear end of the first front turnover rod; an upper end of the first rear support rod is pivotally connected to the first rear top pivot seat, and a lower end of the first rear support rod is pivotally connected to a front end of the first rear turnover rod.

6. The cart according to claim 1, wherein a rear end of the first front bottom rod is provided with a first front bottom pivot pipe, a front end of the first rear bottom rod is provided with a first rear bottom pivot seat, and the first rear bottom pivot seat is pivotally connected to a middle portion of the first front bottom pivot pipe; when the first side-bracket is unfolded, the first front bottom pivot pipe abuts against an upper surface of the first rear bottom pivot seat.

7. The cart according to claim 2, wherein the second side-bracket includes a second front bottom rod, a second rear bottom rod, a second front top rod, and a second rear top rod; the second front bottom rod is pivotally connected to the second rear bottom rod, and the second front top rod is pivotally connected to the second rear top rod; and when a pivot axis of the second front bottom rod and the second rear bottom rod is parallel to a pivot axis of the second front top rod and the second rear top rod, the second front bottom rod is configured to rotate relative to the second rear bottom rod, and the second front top rod is configured to rotate relative to the second rear top rod, such that the second side-bracket is folded or unfolded.

8. The cart according to claim 7, wherein the second side-bracket further includes a second connecting assembly; the second connecting assembly includes a second front diagonal rod, a second rear diagonal rod, and a second pivot mechanism; a front end of the second front diagonal rod is pivotally connected to a front end of the second front bottom rod, and a rear end of the second rear diagonal rod is pivotally connected to a rear end of the second rear bottom rod; the second pivot mechanism is respectively connected to a rear end of the second front top rod, a front end of the second rear top rod, a rear end of the second front diagonal rod, and a front end of the second rear diagonal rod, and enables the four ends to be pivotally connected to each other.

9. The cart according to claim 8, wherein the second connecting assembly further includes a second front top pivot seat provided between the second pivot mechanism and the second front top rod, and a second rear top pivot seat provided between the second pivot mechanism and the second rear top rod;

a front end of the second front top pivot seat is pivotally connected to the rear end of the second front top rod, a rear end of the second front top pivot seat is pivotally connected to the second pivot mechanism, a rear end of the second rear top pivot seat is pivotally connected to a front end of the second rear top rod, and a front end of the second rear top pivot seat is pivotally connected to the second pivot mechanism;

the second connecting assembly further includes a second front support rod, and a second rear support rod; an upper end of the second front support rod is pivotally connected to the second front top pivot seat, a lower end of the second front support rod is pivotally connected to a rear end of the second front bottom rod, an upper end of the second rear support rod is pivotally connected to the second rear top pivot seat, and a lower end of the second rear support rod is pivotally connected to a front end of the second rear bottom rod.

10. The cart according to claim 7, wherein a rear end of the second front bottom rod is provided with a second front bottom pivot pipe, and a front end of the second rear bottom rod is provided with a second rear bottom pivot seat; the second rear bottom pivot seat is pivotally connected to a middle portion of the second front bottom pivot pipe; when the second side-bracket is unfolded, the second front bottom pivot pipe abuts against an upper surface of the second rear bottom pivot seat.

11. The cart according to claim 3, wherein the second side-bracket includes a second front bottom rod, a second rear bottom rod, a second front top rod, and a second rear top rod; the second front bottom rod is pivotally connected to the second rear bottom rod, and the second front top rod is pivotally connected to the second rear top rod;

when a pivot axis of the second front bottom rod and the second rear bottom rod is parallel to a pivot axis of the second front top rod and the second rear top rod, the second front bottom rod is configured to rotate relative to the second rear bottom rod, and the second front top rod is configured to rotate relative to the second rear top rod, such that the second side-bracket is folded or unfolded;

the second side-bracket further includes a second front turnover rod, a second rear turnover rod, and a second connecting assembly; the second front turnover rod is parallel to and hinged with the second front bottom rod, and the second rear turnover rod is parallel to and hinged with the second rear bottom rod; and the second connecting assembly interconnects the second front top rod, the second rear top rod, the second front turnover rod, and the second rear turnover rod, such that a second turnover body is formed; and when an articulated shaft of the second front turnover rod and the second front bottom rod is coaxial with an articulated shaft of the second rear turnover rod and the second rear bottom rod, the second front turnover rod is configured to rotate relative to the second front bottom rod, and the second rear turnover rod is configured to rotate relative to the second rear bottom rod, such that an upper end of the second turnover body is flipped downward relative to a lower end thereof toward a direction away from the storage chamber.

12. A cart capable of being laterally opened, comprising a cart body, wherein the cart body comprises a main frame1 and a first side-bracket arranged on one side of the main frame, a storage chamber is formed between the main frame and the first side-bracket, and the first side-bracket is detachably connected to the main frame;

when the first side-bracket is disconnected from the main frame, an upper end of the first side-bracket is flipped downward relative to a lower end thereof toward a direction away from the storage chamber, such that a first side-opening communicated with the storage chamber is formed at the side of the main frame, wherein a locking device is provided between the first side-bracket and the main frame; the locking device includes a first locking seat and a second locking seat, either one of the first locking seat and the second locking seat is arranged on the first side-bracket, the other one of the first locking seat and the second locking seat is arranged on the main frame, and the first locking seat and second locking seat are connected by insertion, snap-fit, or a locking member.

13. The cart according to claim 12, wherein the first locking seat is provided with a first locking hole, and the second locking seat is provided with a second locking hole; the locking member passes through the first locking hole and extends into the second locking hole, such that the first locking seat is connected with the second locking seat.

14. The cart according to claim 13, wherein the first locking seat is provided with a mounting groove, the mounting groove is arranged on a side of the first locking hole and communicated with the first locking hole, and the locking member is movably arranged within the mounting groove; one end of the locking member passes through into the first locking hole, and a self-locking spring is provided between the other end of the locking member and a side wall of the mounting groove; the self-locking spring has a tendency to drive the locking member to move toward a direction of extending into the second locking hole, an unlocking module is provided on the locking member, when the unlocking module is driven to move away from the second locking hole, the locking member is driven to retract from the second locking hole.

15. The cart according to claim 14, wherein the first locking seat is provided with a limiting chute, and a through hole that communicates the limiting chute with the mounting groove; a longitudinal direction of the limiting chute is coaxial with an axial direction of the first locking hole, the unlocking module includes a dragging portion and a connecting portion, wherein the dragging portion is movably provided within the limiting chute, one end of the connecting portion is fixedly connected to the locking member, and the other end of the connecting portion passes through the through hole and fixedly connected to the dragging portion.

16. The cart according to claim 13, wherein the locking member includes a locking portion, and a sleeve portion, wherein the locking portion has a diameter greater than that of the sleeve portion; a sidewall of the mounting groove is provided with a positioning groove and a positioning hole that are both coaxial with the first locking hole; one end of the locking member penetrates into the first locking hole, and the other end of the locking member is engaged with the positioning hole; the self-locking spring is sleeved around the sleeve portion, one end of the self-locking spring abuts against the locking portion, and the other end of the self-locking spring abuts against the positioning groove.

17. The cart according to of claim 12, wherein the first locking seat is provided with a first insertion plate, and a first insertion slot; the second locking seat is provided with a second insertion plate, and a second insertion slot; when the first locking seat is connected to the second locking seat, the first insertion plate is engaged with the second insertion slot, and the second insertion plate is engaged with the first insertion slot.

* * * * *